United States Patent [19]
Kiya et al.

[11] Patent Number: 4,887,220
[45] Date of Patent: Dec. 12, 1989

[54] PARAMETER INITIALIZING METHOD FOR A PROGRAMMABLE MACHINE CONTROLLER

[75] Inventors: Nobuyuki Kiya, Hachioji; Shuji Toriyama, Kawasaki; Yoshiharu Saiki, Hachioji, all of Japan

[73] Assignee: Fanuc Ltd., Kawasaki, Japan

[21] Appl. No.: 143,859

[22] PCT Filed: Apr. 24, 1987

[86] PCT No.: PCT/JP87/00264
§ 371 Date: Dec. 23, 1987
§ 102(e) Date: Dec. 23, 1987

[87] PCT Pub. No.: WO87/06728
PCT Pub. Date: Nov. 5, 1987

[30] Foreign Application Priority Data
Apr. 28, 1986 [JP] Japan ................................ 61-96881

[51] Int. Cl.$^4$ .......................................... G06F 15/46
[52] U.S. Cl. .......................... 364/474.11; 364/474.22
[58] Field of Search ................... 364/474.11, 474.22, 364/184, 191, 192, 474.34, 474.36, 474.26, 132, 131, 130, 474.09, 200, 900, 140

[56] References Cited
U.S. PATENT DOCUMENTS

| | | | |
|---|---|---|---|
| 4,251,858 | 2/1981 | Cambigue | 364/474.11 |
| 4,364,110 | 12/1982 | Hyatt | 364/474.22 |
| 4,396,976 | 8/1983 | Hyatt | 364/474.22 |

Primary Examiner—Fleming: Michael R.
Attorney, Agent, or Firm—Staas & Halsey

[57] ABSTRACT

There is provided an initializing method for a programmable machine controller, whereby various control parameters of the programmable machine controller can be initialized quickly. The initial values of the various parameters, stored in a random access memory for initial-value setting of the controller, are transferred to a blank region of another random access memory for storage therein (S1~S4), and then transferred to a read-only memory (ROM) cassette for storage therein (S5). When a command for parameter initialization is delivered with the controller loaded with the ROM cassette, the various parameters are initialized using the initial values stored in the cassette.

7 Claims, 3 Drawing Sheets

PARAMETER INITIALIZING METHOD FOR A PROGRAMMABLE MACHINE CONTROLLER

BACKGROUND OF THE INVENTION

1. Field of the Invention

The present invention relates to a method of initializing parameters in a programmable machine controller (hereinafter referred to as PMC) of a numerical control unit (hereinafter referred to as NC unit).

2. Description of the Related Art

Conventionally known is an NC unit which includes a PMC adapted for sequence control of various control sections, such as counters, timers, keep relays, etc. For some reason or other, in the NC unit of this type, it may happen to become necessary to initialize the values of various parameters during the operation of the PMC or change of these parameter values. Conventionally, however, this process of initialization must be executed by manual operation, which entails some trouble.

Generally, in the NC unit of this type, the PMC is furnished with a programmable machine controller-random access memory board (hereinafter referred to as PMC-RAM board) for debugging. After a debugging process using a memory unit carried by the RAM board, the PMC is loaded with a read-only memory cassette (hereinafter referred to as ROM cassette), so that memory contents, including PMC parameter values and stored in the memory unit of the RAM board, are transferred to and stored in a memory unit built in the cassette. In this state, the NC unit is shipped to be delivered to a user. Thus, the NC unit is operated with the ROM cassette therein and by utilizing the memory contents stored in the cassette. In initializing the PMC parameter values, moreover, the initial values of the various parameters, which are set by means of a manual setting section of the NC unit, are generally transferred to and stored in a separate RAM of the PMC through a predetermined transfer path. While the PMC is mounted with the PMC-RAM board, that is, during the debugging process, the parameters can be initialized with use of a parameter cassette or an initialization program based on the PASCAL language or the like.

As described above, the PMC parameters usually must be initialized by manual operation, and the capacity to cover all the parameter values is normally as large as 2K bits. Thus, the initialization requires a long time. Moreover, the conventional method, based on the manual operation as mentioned above, lacks in high-speed performance, whereas the initialization is often a matter of urgency.

SUMMARY OF THE INVENTION

Accordingly, an object of the present invention is to provide a method of PMC parameter initialization, whereby PMC parameters can be easily initialized even when a PMC is loaded with a ROM cassette.

In order to achieve the above object of the present invention, there is provided a parameter initializing method for a programmable machine controller, which performs a control operation, using predetermined memory contents transferred to and stored in a read-only memory cassette, after debugging by means of a random access memory for debugging, the method comprising steps of: (a) storing a random access memory of the programmable machine controller for initial-value setting with the initial values of various control parameters of the programmable machine controller; (b) transferring to and storing the initial values in a blank memory region of the random access memory for debugging; (c) transferring to and storing in the read-only memory cassette the predetermined memory contents in the random access memory for debugging and the initial values of the various control parameters; and (d) initializing the values of the various control parameters with use of the initial values stored in the read-only memory cassette, in response to a command for parameter initialization, when the controller is loaded with the cassette.

According to the present invention, as described above, the initial values of the PMC parameters are always stored in the ROM cassette, so that the PMC parameters can be initialized instantly by inputting the command for parameter initialization. Thus, the parameter initialization does not require such a long time as is needed in the conventional case.

DESCRIPTION OF THE PREFERRED EMBODIMENT

Figure 1:
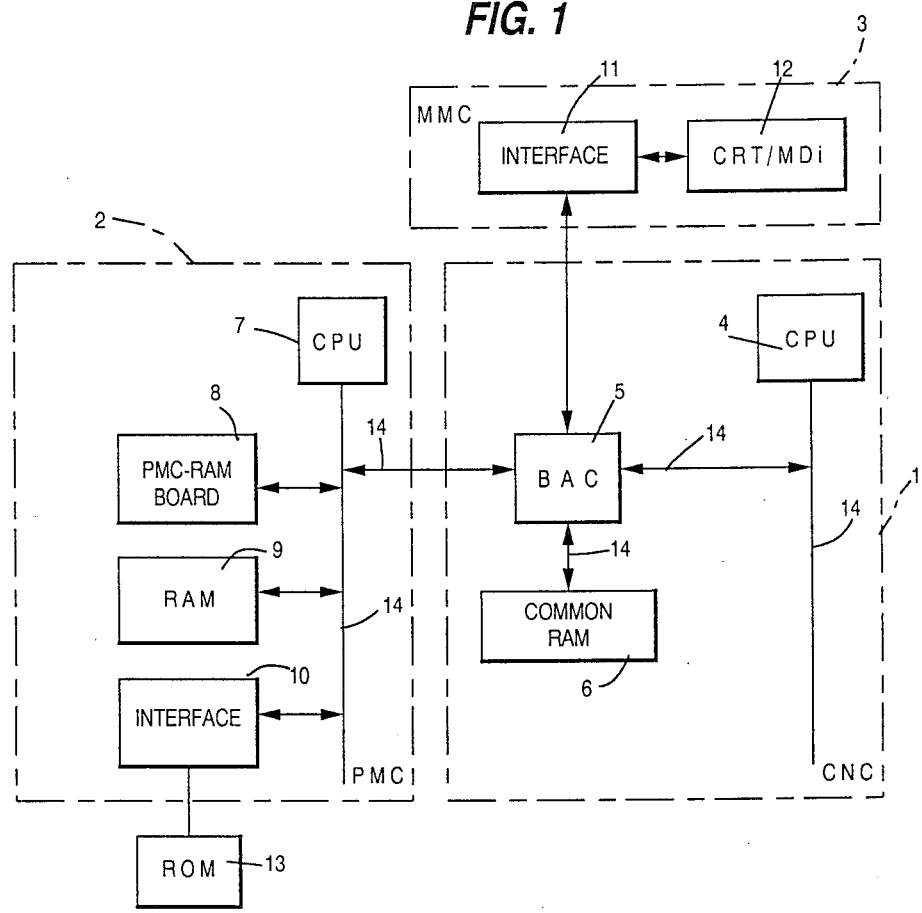
FIG. 1 is a block diagram showing the principal part of an NC unit according to an embodiment of the present invention.

FIG. 1 shows the principal part of an NC unit according to an embodiment of the present invention. The NC unit comprises a CNC 1 of a numerical control section, a PMC 2, and a man-machine controller (hereinafter referred to as MMC) 3. The PMC 2 is bus-connected to a bus-arbiter controller (hereinafter referred to as BAC) 5, while MMC 3 is serial-connected to the BAC 5. Numeral 4 denotes a central processing unit (hereinafter referred to as CPU), and numeral 6 denotes a common RAM which is bus-connected to the BAC 5. Part of the RAM 6 is composed of a nonvolatile RAM. Numeral 7 denotes a CPU of the PMC; 8, a PMC-RAM board; 9, a random access memory (hereinafter referred to as RAM); and 10, an interface. A ROM cassette 13 can be connected to the interface 10. Numeral 11 denotes an interface of the MMC 3, through which is connected a manual-data input device with a CRT display (hereinafter referred to as CRT/MDi) 12. Numeral 14 denotes buses.

Figure 2:
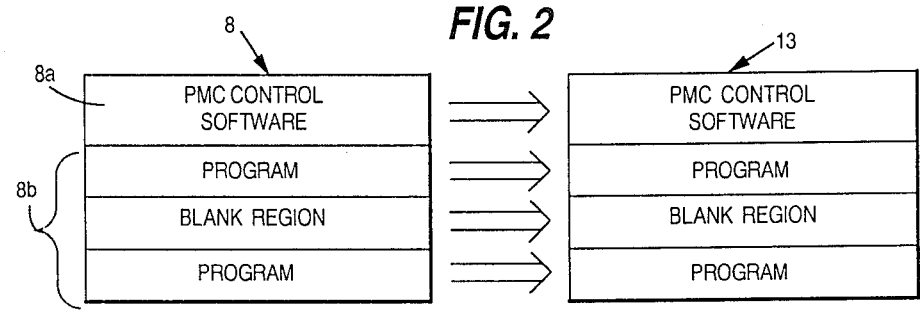
FIG. 2 is a diagram showing a format according to which the contents of a PMC-RAM board are written in a ROM cassette.

As shown in FIG. 2, a memory unit carried by the PMC-RAM board 8 includes a ROM region 8a for storing PMC control software and a RAM region 8b for storing various sequence programs and the like. During a debugging process in the NC unit, the board 8 is normally attached to the PMC 2, as shown in FIG. 1. Before the machine is delivered to a user or the like, after having undergone a debugging process and other processes, the memory contents of the PMC-RAM board 8 are transferred to and stored in a memory unit in the ROM cassette 13 through the interface 10. As a result, the memory contents of the memory unit of the PMC- RAM board 8 are copied into the ROM cassette 13 as they are, as shown in FIG. 2. The NC unit is shipped in a state such that the ROM cassette 13 storing the contents of the PMC-RAM board 8 is attached, in place of the PMC-RAM board 8, to the PMC 2. Thus, the NC unit is usually loaded with the ROM cassette 13 when it is used.

Conventionally, in initializing the values of PMC parameters, i.e., various parameters of counters, timers, keep relays, etc., with the ROM cassette 13 mounted in place of the PMC-RAM board 8, the various parameter values are stored in a nonvolatile section of the common RAM 6 by means of a manual-data input section of the CRT/MDi 12, through the medium of the interface 11 and the BAC 5. Then, the initial values of the various parameters, set in the common RAM 6, are transferred to the RAM 9 by the CPU 7 of the PMC 2. This initialization system, however, is subject to a drawback when a large capacity is used to store the PMC parameters, the initialization by manual input requires too much time.

Therefore, the present invention is designed so that the initial values of the PMC parameters are written in the ROM cassette 13 when the contents of the memory unit of the PMC-RAM board 8 are written in the ROM cassette 13. Thus, the initialization is performed using the initial values of the PMC parameters stored in the ROM cassette 13.

Figure 3:
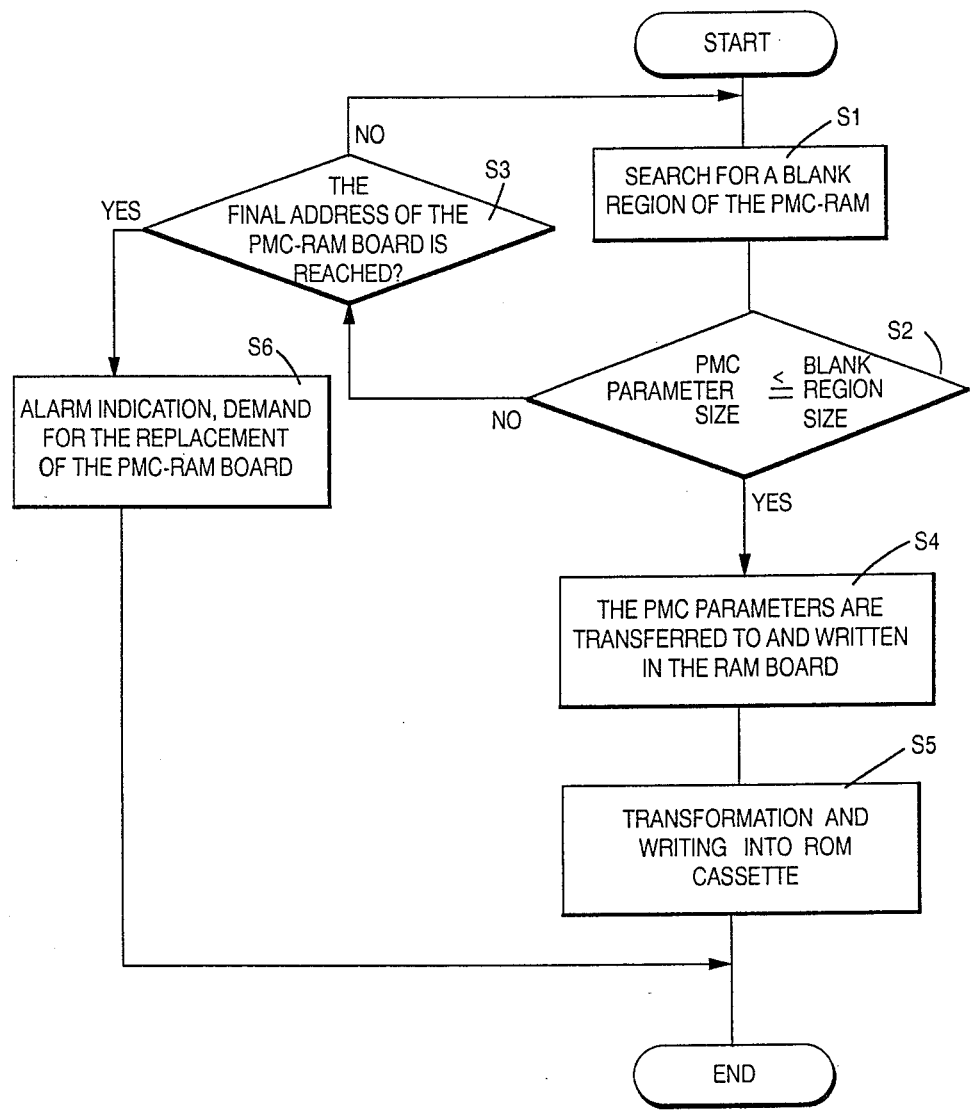
FIG. 3 is a flow chart of a control program for writing the contents of a memory unit, carried by the PMC-RAM board, in the ROM cassette of FIG. 1.

When the memory contents of the PMC-RAM board 8 are written in the ROM cassette 13 after the end of the debugging process, the CPU 7 of the PMC 2 performs the processing shown in FIG. 3.

First, the initial values of the PMC parameters of the RAM 9 of the PMC 2 are stored in a memory region (A~B) for setting the initial values of the PMC parameters. Thereafter, a write command is inputted through the CRT/MDi 12. When this command is inputted, the program of FIG. 3 is executed. First, the CPU 7 searches for a blank region of the PMC-RAM board 8 (Step S1). Then, the CPU 7 compares the memory size of the detected blank region with that of the PMC-parameter memory region (A~B) of the RAM 9, and determines whether the size of the blank region is equal to or greater than the PMC parameter size (Step S2). If the PMC-parameter memory region (A~B) of the RAM 9 is greater, then all the initial values of the PMC parameters cannot be written in the detected blank region, so that the storage in the ROM cassette 13 is held. Then, whether the final address of the PMC-RAM board 8 is reached is determined (Step S3), and the processes of Steps S1 to S3 are repeated. If a blank region of the PMC-RAM board 8 greater than or equal to the PMC-parameter memory region (A~B) is found in the step S2, the initial values of the PMC parameters, stored in the RAM 9, are transferred to and written in the blank region (Step S4).

Figure 4:
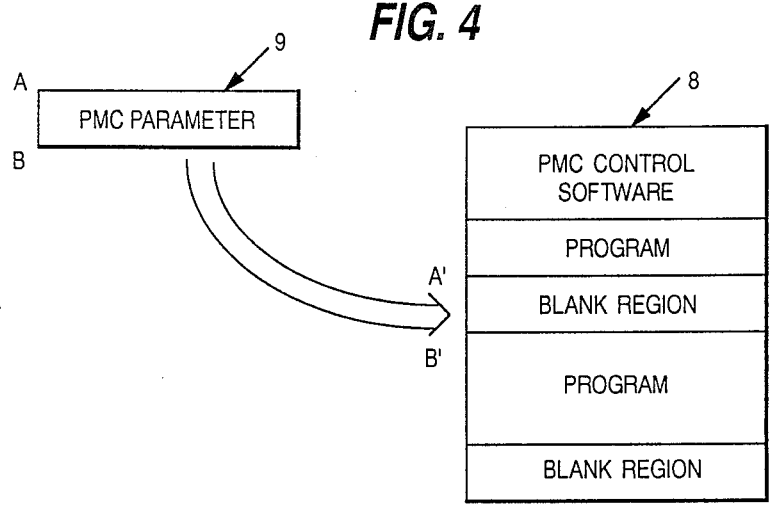
FIG. 4 is a diagram for illustrating the operation for writing the initial values of PMC parameters in the memory unit of the PMC-RAM board.

For example, if there exists a blank region between A' and B' in the RAM region of the PMC-RAM board 8, as shown in FIG. 4, the size of the blank region (A'~B') is compared with that of the PMC-parameter memory region (A~B) of the RAM 9. If the blank region (A'~B') of the PMC-RAM board 8 is greater or both these regions are equal in size, that is, if (A~B)-≦(A'~B') holds, the initial values of the PMC parameters are written in the blank region.

After the initial values of the PMC parameters are thus written in the blank region of the PMC-RAM board 8, the contents of the PMC-RAM board 8 are written in the ROM cassette 13 (Step S5) in the same conventional manner as aforesaid.

If the size of the blank region of the PMC-RAM board 8 is smaller than that of each PMC-parameter memory region (A~B) of each RAM 9, on the other hand, and if it is concluded in Step S3 that the final address of the PMC-RAM board 8 is reached, the CPU 7 causes an alarm indication to be displayed on a CRT screen of the CRT/MDi 12, through the medium of the BAC 5 and the interface 11, and makes a demand for the replacement of the PMC-RAM board 8 by one with a larger capacity. When the write command is inputted again through the CRT/MDi 12 after replacement by the larger-capacity PMC-RAM board 8, the processes of Step S1 and the subsequent steps are executed, and the initial values of the PMC parameters are written in the ROM cassette 13.

Then, the PMC 2 is loaded with the ROM cassette 13, with the required contents written therein, and the PMC-RAM board 8 is removed. Thereafter, the NC unit is submitted to use.

Figure 5:
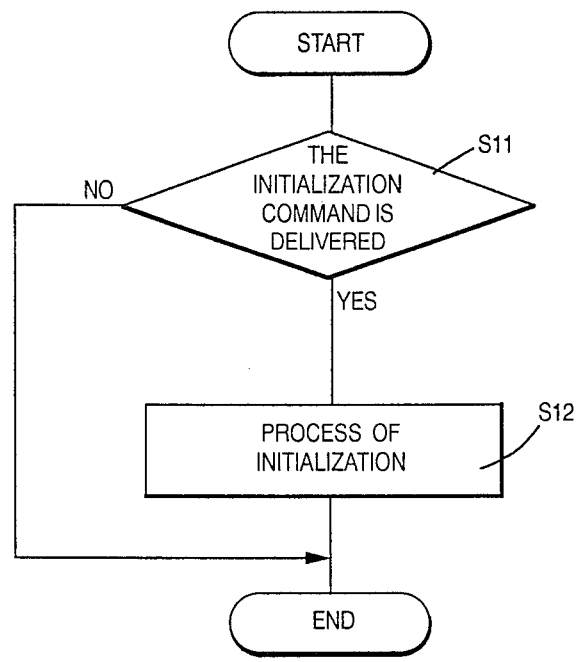
FIG. 5 is a flow chart of an initialization program.

If it is necessary to initialize the PMC parameters, an initialization command is inputted through the CRT/MDi 12 with the ROM cassette 13 mounted. The CPU 7 determines whether the initialization command is delivered (Step S11 of FIG. 5), and sets the initial values of the PMC parameters, stored in the ROM cassette 13, in the RAM 9 and the common RAM 6, thus initializing the PMC parameters instantly (Step S12).

What is claimed is:

1. A parameter initializing method for a programmable machine controller performing a control operation using predetermined memory contents stored in a read-only memory cassette, said method comprising:
   (a) storing in an initial value random access memory of said programmable machine controller initial values of various control parameters of said programmable machine controller;
   (b) transferring the initial values into a blank memory region of a debugging random access memory having predetermined memory contents;
   (c) transferring to and storing in said read-only memory cassette said predetermined memory contents in said debugging random access memory and the initial values of said various control parameters; and
   (d) initializing said various control parameters using the initial values stored in said read-only memory cassette, in response to a command for parameter initialization, after said programmable machine controller has been loaded with said read-only memory cassette.

2. A parameter initializing method for a programmable machine controller according to claim 1, wherein said transferring in step (b) includes the steps of:
   (b1) searching for the blank memory region in the debugging random access memory, and
   (b2) determining whether the blank memory region, searched for in step (b1), has a capacity large enough to store all of the initial values of said various control parameters stored in said initial value random access memory.

3. A parameter initializing method for a programmable machine controller according to claim 2, wherein said transferring in step (c) is executed after step (b2) determines that the capacity of the blank memory region found in step (b1) is large enough to store all of the initial values of said various control parameters.

4. A parameter initializing method for a programmable machine controller according to claim 2 or 3,
   wherein step (b) further comprises the step of (b3) repeating step (b1) to search for another blank memory region when step (b2) determines that the capacity of the blank memory region is too small, and
   wherein said method further comprises the step of (e) issuing an alarm when step (b2) fails to determine that the capacity of any blank memory region, searched for in said step (b1), is large enough to store all of the initial values of said various control parameters.

5. A method for setting a read only memory with initial values for control parameters of a programmable machine controller in a numerical control unit, comprising the steps of:
   (a) determining the initial values of the control parameters;
   (b) storing the initial values determined in step (a) in a first portion of random access memory;
   (c) transferring the initial values of the control parameters from the first portion of random access memory into a blank region of a second portion of random access memory; and
   (d) transferring the values of the parameters into the read-only memory.

6. A method as recited in claim 5, further comprising the steps of:
   (e) debugging the programmable machine controller using the initial values stored in the second portion of random access memory, prior to performing step (d); and
   (f) removing the second portion of random access memory and replacing with the read-only memory, after performing step (d).

7. A method as recited in claim 6, further comprising the steps of:
   (g) storing a control program for the programmable machine controller in the second portion of random access memory, prior to performing step (c); and
   (h) locating the blank region of the second portion of random access memory prior to performing step (c).

* * * * *